United States Patent
Gomez, Sr. et al.

(10) Patent No.: US 7,434,350 B1
(45) Date of Patent: Oct. 14, 2008

(54) TWO-HANDED FISH HOOK REMOVAL APPARATUS

(76) Inventors: Jerry J. Gomez, Sr., P.O. Box 831045, San Antonio, TX (US) 78204; Alice E. Gomez, P.O. Box 831045, San Antonio, TX (US) 78204

( * ) Notice: Subject to any disclaimer, the term of this patent is extended or adjusted under 35 U.S.C. 154(b) by 370 days.

(21) Appl. No.: 11/180,272

(22) Filed: Jul. 14, 2005

(51) Int. Cl.
*A01K 97/18* (2006.01)
(52) U.S. Cl. ................................ 43/53.5
(58) Field of Classification Search .......... 43/4, 43/53.5; 7/106; 452/101–105, 137
See application file for complete search history.

(56) References Cited

U.S. PATENT DOCUMENTS

| | | | | |
|---|---|---|---|---|
| 2,050,194 | A | * | 8/1936 | Pflueger ............... 43/53.5 |
| 4,118,883 | A | * | 10/1978 | Watkins ............... 43/43.16 |
| 4,127,957 | A | * | 12/1978 | Bourquin et al. ............... 43/53.5 |
| 4,276,675 | A | * | 7/1981 | Pioch ............... 16/426 |
| 4,746,122 | A | * | 5/1988 | Fitzgerald ............... 273/153 R |
| 5,501,688 | A | * | 3/1996 | Whiteside et al. ............... 606/103 |
| 5,644,865 | A | | 7/1997 | Harrison et al. |
| 5,921,016 | A | | 7/1999 | Shelton |
| 5,934,009 | A | | 8/1999 | Trahan |
| 5,934,139 | A | * | 8/1999 | Tucker ............... 72/479 |
| 6,185,858 | B1 | * | 2/2001 | Choron ............... 43/44.83 |
| D443,334 | S | | 6/2001 | Duncan |
| 6,240,673 | B1 | | 6/2001 | Shelton |
| 6,272,788 | B1 | | 8/2001 | Bergacker |
| 2004/0075286 | A1 | * | 4/2004 | Skowron ............... 294/58 |

* cited by examiner

*Primary Examiner*—David J Parsley

(57) ABSTRACT

A fish hook removal apparatus includes a shaft having opposed end portions. One end portion defines a hook for fitting into a fish's mouth. Such a hook is engageable with a fish hook. The shaft enables a user to remove a hook from fish. A grip is positioned about another end portion. Such a grip includes indentations spaced along a length of the grip allowing for a firm grasp. A clevis is attached to the shaft and situated proximate to the grip. A handle includes body and rod portions. Such a rod portion has opposed end portions. The body portion is positioned about one end of the rod extending from the body. The handle is abutted against the shaft in such a manner that rotation of the handle causes the hook to twist about a fishing hook lodged within the fish's mouth, thereby dislodging the fishing hook.

5 Claims, 3 Drawing Sheets

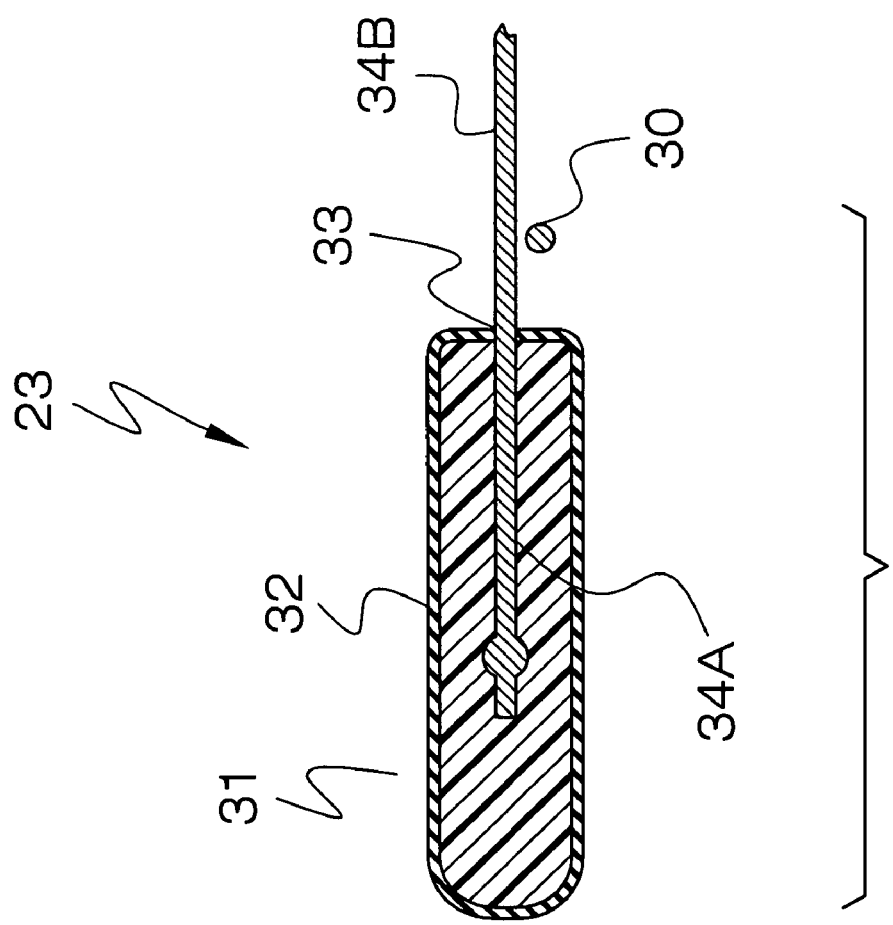
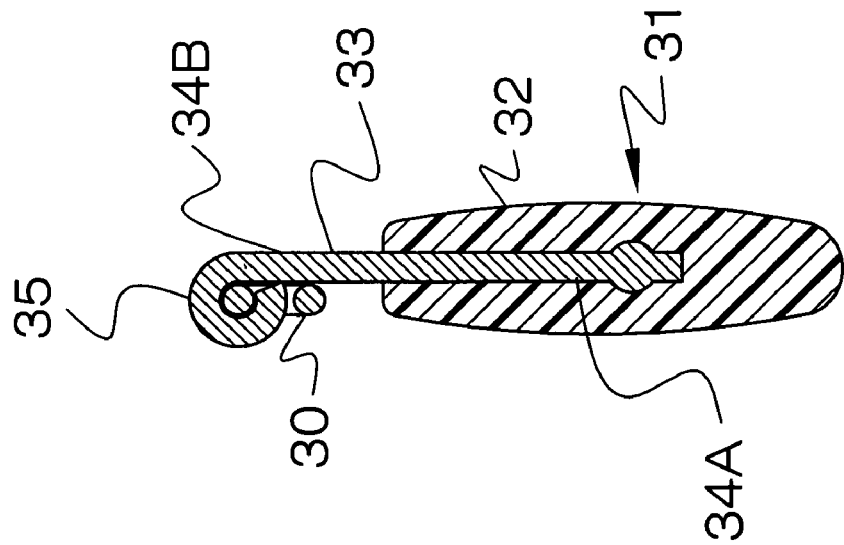
FIG. 3
FIG. 4

TWO-HANDED FISH HOOK REMOVAL APPARATUS

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to fishing related apparatuses and, more particularly, to a two-handed fish hook removal apparatus.

2. Prior Art

Fishing is a popular and rapidly growing sport. Once a fish is caught and reeled in, a fisherman removes the fish hook either by hand or with an implement such as forceps, small pliers or the like. At this point, the fisherman may keep the fish or, as is becoming more common, release the fish back into the water. Many waters are regulated so that fish are required to be released. As fishing gains in popularity, increasing numbers of lakes and streams are being designated as "catch and release" only areas.

In "catch and release" fishing, the health of the fish after the release becomes a key issue. Research studies have shown a dramatic relationship between the amount of time that a fish is handled as it is being caught and released, and its chances of survival. One study by the University of Ontario, Canada, found an astounding 68% range in mortality rates, with a direct relationship existing between the extent of fish handling, exposure to air during catch and release, and a fish's chances of survival.

There are a number of ways in which a fish's health can be compromised during the catch and release process. For example, the protective coating of slime covering the fish's body may be partially removed during handling by the fisherman, thereby leaving the unprotected areas vulnerable to waterborne infections. The delicate mouth and jaw area, as well as the gill membranes, may be damaged by the fish hook, the implement used to remove the hook, or the hands of the fisherman. The internal organs of the fish may be damaged by squeezing the fish too tightly. In addition, relatively brief exposure to air has been shown to damage gill membranes, causing delayed respiratory shock and death as much as 24 hours after the fish is released back into the water.

In order to insure the highest chances of survival for the fish, it is desirable to catch and then release the fish underwater, with as little physical contact between the fisherman and the fish as possible. It is also desirable to remove the hook from the fish without damaging the hook.

However, prior art fish hook removers do not adequately address these concerns. Typical prior art fish hook removers used by fishermen include devices designed to grab the shank, or straight part of the fish hook, with a clamping action. The fish hook is then twisted, pushed, or pulled out of its engagement with the fish's mouth. A major drawback with these clamping type devices is that they are cumbersome to use, thereby making it difficult to grab the hook when caught in the mouth of a live flapping fish. The fish usually must be held still, often with some force, in order to grab the hook with the clamping type device. In order to accomplish the removal of the fish hook, the fisherman typically ends up handling the fish so that the fish is immobilized during removal.

Accordingly, a need remains for a two-handed fish hook removal apparatus in order to overcome the above-noted shortcomings. The present invention satisfies such a need by providing a two-handed fish hook removal apparatus that is convenient, time saving, efficient, simple, and safe.

BRIEF SUMMARY OF THE INVENTION

In view of the foregoing background, it is therefore an object of the present invention to provide an apparatus for removing fish hooks. These and other objects, features, and advantages of the invention are provided by a two-handed apparatus for assisting a user in removing fish hooks.

The apparatus includes a rectilinear and elongated shaft having a centrally disposed longitudinal axis and opposed end portions. One of the end portions advantageously defines a hook suitably sized and shaped for fitting into a fish's mouth. Such a hook is conveniently, slidably, and removably engageable with a fish hook for removing the fish hook from the fish's mouth. The shaft has a length sufficiently long enough to effectively enable a user to safely remove a hook from a landed fish without risking injury from contact with the spines, fins or teeth of the fish.

A grip member is axially and directly positioned about another of the end portions. The grip member may include an outer surface formed from rubber material. Such a grip member includes a plurality of monolithically formed and linearly juxtaposed indentations equidistantly spaced along a length of the grip member such that the grip member can advantageously be firmly grasped by a user.

A clevis is directly attached to the shaft and situated proximate to the grip member. Such a clevis extends upwardly from the shaft and has a substantially inverted U-shape oppositely spaced from the hook. A handle includes directly conjoined body and rod portions. The handle is preferably formed from plastic material. Such a rod portion has opposed end portions. The body portion is axially and directly positioned about one of the end portions of the rod. The rod extends outwardly from the body and parallel to a longitudinal axis of the body. The shaft, the clevis and the rod are preferably formed from stainless steel to resist corrosion in a marine environment.

Another of the end portions of the rod preferably defines a monolithically formed eyelet. Such an eyelet is directly and rotatably engageable with the clevis such that the position of the handle can be conveniently and selectively adapted for use by left or right handed users. The handle may be disposed proximate to the grip member and orthogonal to the shaft such that a user can selectively and manually rotate the shaft and the hook member counterclockwise about the axis while using two hands for increased torque in effectively removing a hook from the fish's mouth. Such a handle is advantageously abutted against the shaft in such a manner that rotation of the handle towards the shaft causes the hook to twist about a fishing hook lodged within the fish's mouth, thereby effectively dislodging the fishing hook while the user's hands remain at a safe distance away from the fish's mouth.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 3 is a cross-sectional view of the grip member shown in FIG. 2, taken along lines 3-3; and FIG. 4 is a cross-sectional view of the handle shown in FIG. 2, taken along lines 4-4;

DETAILED DESCRIPTION OF THE INVENTION

Figure 1:
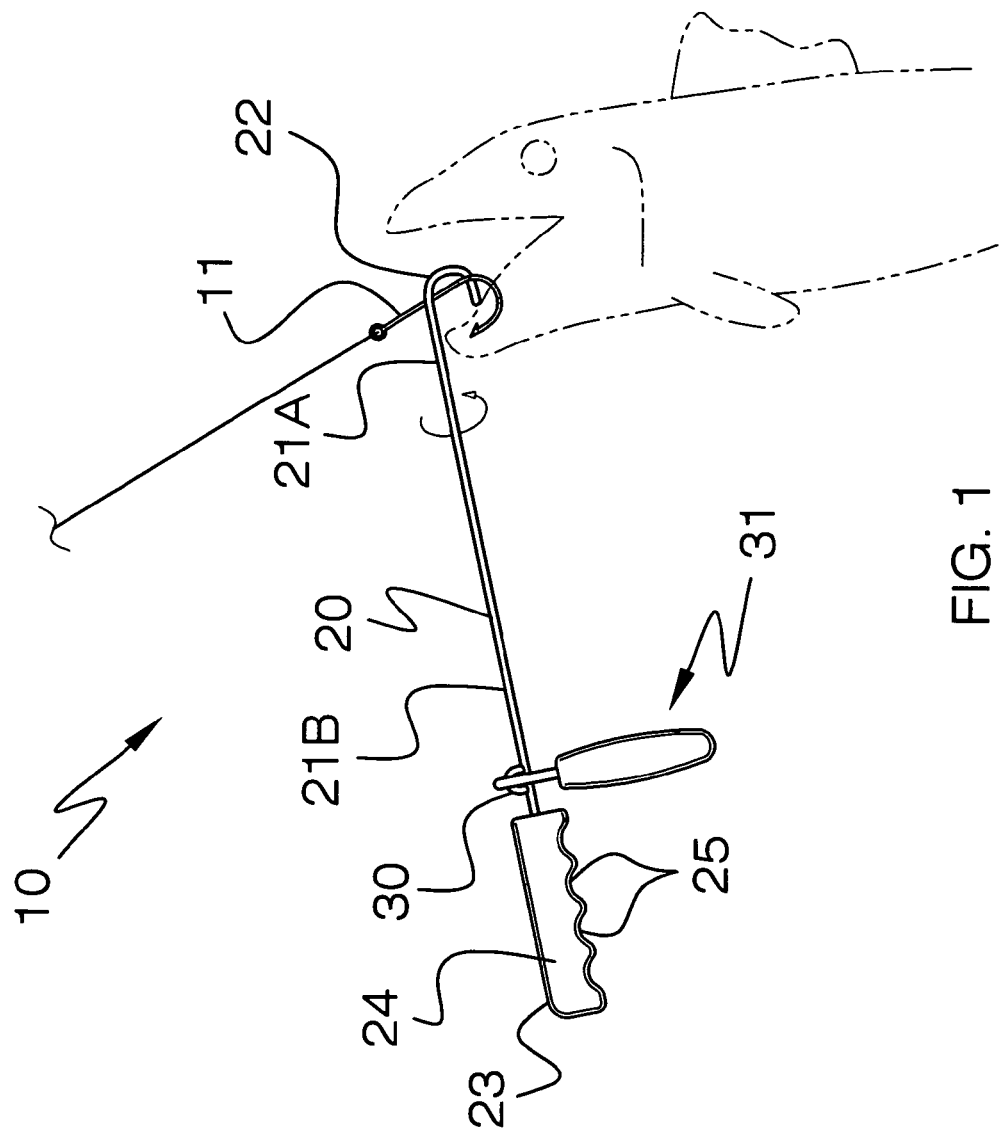
FIG. 1 is a side-elevational view showing a two-handed apparatus for removing fish hooks, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-4 by the reference numeral 10 and is intended to provide an apparatus for removing fish hooks. It should be understood that the apparatus 10 may be used to protect many different types of removal apparatuses and should not be limited in use only to fish hooks.

Figure 2:
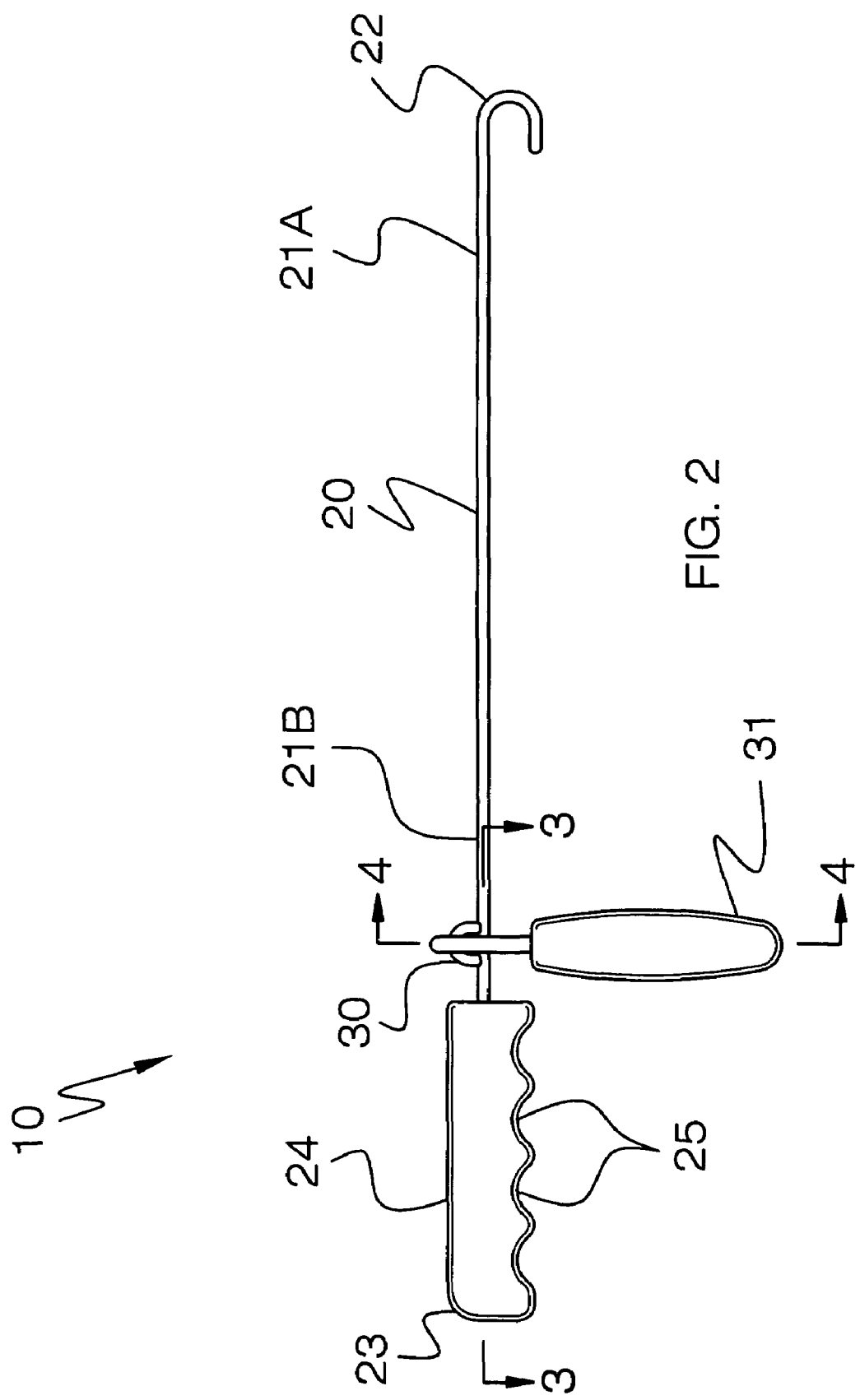
FIG. 2 is a side-elevational view of the apparatus shown in FIG. 1.

Initially referring to FIGS. 1 and 2, the apparatus 10 includes a rectilinear and elongated shaft 20 having a centrally disposed longitudinal axis and opposed end portions 21. One of the end portions 21A advantageously defines a hook 22 suitably sized and shaped for fitting into a fish's mouth. Such a hook 22 is conveniently, slidably, and removably engageable with a fish hook 11 for removing the fish hook 11 from the fish's mouth. The shaft 20 has a length sufficiently long enough to effectively enable a user to safely remove a hook 11 from a landed fish without risking injury from contact with the spines, fins or teeth of the fish. This is absolutely critical to the invention as it allows the user to handle and remove a fishing hook 11 from a fish without exposure to injury from the fish's natural defenses, thereby increasing the safety and efficiency of the procedure. In doing so, the user foregoes any physical contact with the fish, preserving the fish's natural slime coat which prevents infection from aquatic organisms, thereby prolonging the lifespan of the fish.

A grip member 23 is axially and directly positioned, with no intervening elements, about another of the end portions 21B. The grip member 23 includes an outer surface 24 formed from rubber material. Such a grip member 23 includes a plurality of monolithically formed and linearly juxtaposed indentations 25 equidistantly spaced along a length of the grip member 23 such that the grip member 23 can advantageously be firmly grasped by a user. This important feature provides the user with a grip member 23 that performs advantageously in dry or wet conditions, the latter of which is expected during the course of a fishing excursion.

Referring to FIGS. 3 and 4, a clevis 30 is directly attached, with no intervening elements, to the shaft 20 and situated proximate to the grip member 23. Such a clevis 30 extends upwardly from the shaft 20 and has a substantially inverted U-shape oppositely spaced from the hook 22. A handle 31 includes body 32 and rod 33 portions directly conjoined with no intervening elements. The handle 31 is formed from plastic material. Such a rod portion 33 has opposed end portions 34. The body portion 32 is axially and directly positioned about one of the end portions 34A of the rod 33. The rod 33 extends outwardly from the body 32 and parallel to a longitudinal axis of the body 32. The shaft 20, the clevis 30 and the rod 33 are preferably formed from stainless steel to resist corrosion in a marine environment.

Referring again to FIGS. 3 and 4, another of the end portions 34B of the rod 33 defines a monolithically formed eyelet 35. Such an eyelet 35 is directly and rotatably engageable with the clevis 30 such that the position of the handle 31 can be conveniently and selectively adapted for use by left or right handed users. The handle 31 is disposed proximate to the grip member 23 and orthogonal to the shaft 20 such that a user can selectively and manually rotate the shaft and the hook member 22 counterclockwise about the axis while using two hands for increased torque in effectively removing a hook 11 from the fish's mouth. The eyelet 35 is a necessary feature of the invention in that it allows for the adjustability of the apparatus 10 to be employed by left or right handed.

The handle 31 is important to the invention as it enables the user to generate the torque necessary to remove fish hooks 11 that are embedded in the fish's mouth. Such a handle 31 is advantageously abutted against the shaft 20 in such a manner that rotation of the handle 31 towards the shaft 20 causes the hook 22 to twist about a fishing hook 11 lodged within the fish's mouth, thereby effectively dislodging the fishing hook 11 while the user's hands remain at a safe distance away from the fish's mouth.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A two-handed fish hook removal apparatus to assist a user in removing a fish hook from a landed fish, said apparatus comprising:

a rectilinear and elongated shaft having a centrally disposed longitudinal axis and opposed end portions, one said end portions defining a hook suitably sized and shaped for fitting into a fish's mouth, said hook being slidably and removably engageable with a fish hook for removing the fish hook from the fish's mouth;

wherein said shaft has a length sufficient long to enable a user to safely remove a hook from a landed fish without risking injury from contact with the spines, fins or teeth of the fish;

a grip member axially and directly positioned about another said end portions, said grip member including a plurality of monolithically formed and linearly juxtaposed indentations equidistantly spaced along a length of said grip member such that said grip member can be firmly grasped by a user;

a clevis directly attached to said shaft and situated proximate said grip member, said clevis extending upwardly from said shaft and having a substantially inverted U-shape oppositely spaced from said hook of said elongated shaft, said clevis being statically and fixedly coupled to said shaft; and a handle including directly conjoined body and rod portions, said rod portion having opposed end portions, said body portion being axially and directly positioned about one said end portion of said rod, said rod extending outwardly from said body and parallel to a longitudinal axis of said body, said body portion having a non-circular shape;

wherein another said end portion of said rod defines a monolithically formed eyelet, said eyelet being directly and rotatably engageable with said clevis such that the position of the handle can be selectively adapted for use by left or right handed users, said eyelet having a circular shape provided with an opening that allows said eyelet to maintain direct contact about said clevis while said handle is rotated about said shaft, wherein said opening has a diameter substantially equal to a thickness of said clevis such that said eyelet is prohibited from disengaging said clevis during rotational movements of said handle;

wherein said handle is abutted against said shaft in such a manner that rotation of said handle towards said shaft causes said hook to twist about a fishing hook lodged within the fish's mouth and thereby effectively dislodge the fishing hook while the user's hands remain at a safe distance away from the fish's mouth;

wherein said rod portion of said handle has a longitudinal length that is shorter than a longitudinal length of said shaft;

wherein said body portion of said handle has a substantially cylindrical shape;

wherein said one end portion of said rod portion is interfitted and penetrated approximately midway into said body portion.

2. The apparatus of claim 1, wherein said handle is disposed proximate said grip member and orthogonal to said shaft such that a user can selectively and manually rotate said shaft and said hook member counterclockwise about the axis while using two-hands for increased torque in removing a hook from the fish's mouth.

3. The apparatus of claim 1, wherein said handle is formed from plastic material.

4. The apparatus of claim 1, wherein said grip member includes an outer surface formed from rubber material.

5. The apparatus of claim 1, wherein said shaft, said clevis and said rod are formed from stainless steel to resist corrosion in a marine environment.

* * * * *